United States Patent [19]
Bohan et al.

[11] Patent Number: 5,371,537
[45] Date of Patent: Dec. 6, 1994

[54] METHOD AND APPARATUS FOR AUTOMATICALLY CALIBRATING A CRT DISPLAY

[75] Inventors: Anne E. Bohan, Rochester; Patrick L. Cottone, E. Rochester, both of N.Y.

[73] Assignee: Eastman Kodak Company, Rochester, N.Y.

[21] Appl. No.: 785,980

[22] Filed: Oct. 31, 1991

[51] Int. Cl.⁵ .................. H04N 17/00; H04N 17/02
[52] U.S. Cl. ................... 348/181; 348/189; 348/190; 356/218
[58] Field of Search ............... 358/10, 139, 903, 163, 358/169, 244; 356/218, 229; 348/180, 181, 184, 185, 189, 190; H04N 17/00, 17/02, 17/04

[56] References Cited
U.S. PATENT DOCUMENTS

| | | | |
|---|---|---|---|
| 4,700,218 | 10/1989 | Thomsen et al. | 358/10 |
| 4,897,721 | 1/1990 | Young et al. | 358/139 |
| 4,927,266 | 5/1990 | Sugiura et al. | 358/218 |
| 5,032,906 | 7/1991 | Um | 358/903 |

Primary Examiner—James J. Groody
Assistant Examiner—Glenton B. Burgess
Attorney, Agent, or Firm—Edward Dugas; Thomas H. Close

[57] ABSTRACT

The present invention is a system that uses a single channel light meter to measure the actual red, green and blue light output response curves of a CRT monitor to the range of possible input monitor code values for each color. A computer is used to transform a desired corresponding tone scale through the corresponding response curve to obtain a look-up table or video shaper that calibrates the monitor to the desired corresponding tone scale. The transformation includes obtaining a tone scale intensity value for each possible input value and searching the actual response values for a closest match. The input monitor code value used to obtain the actual response matching intensity for the possible input value is the calibrated value displayed by the monitor when an image includes the possible input value. The system is used throughout the life of the monitor to bring the monitor back to calibration as it changes.

6 Claims, 7 Drawing Sheets

METHOD AND APPARATUS FOR AUTOMATICALLY CALIBRATING A CRT DISPLAY

BACKGROUND OF THE INVENTION

1. Field of the Invention

The present invention is directed to automatic calibration control of a CRT monitor which allows the light output response of the monitor to be initially adjusted and maintained as the monitor ages and, more particularly, to using a single channel light meter to produce a light output response curve of the monitor, which curve is used with an aim or preferred tone scale curve to create a video shaper, where the video shaper modifies the code values sent to the monitor when a picture, stored as a digital image, is being reproduced.

2. Description of the Related Art

In automated print shops and other color image reproduction facilities, it is critically important that electronic images displayed at different times maintain consistent and accurate color characteristics. For example, when a layout artist is designing a full color layout, for example a magazine, using a computer based system, a digital image displayed on the monitor (CRT) today must have the same color and tone scale reproduction as when the image is displayed in the future. In addition, the displayed image should match as closely as possible the image as it is reproduced in hard copy format, that is, the images should have the same tone scale. However, the color fidelity of CRT monitors degrade over time due to component aging and a stored digital image will appear to change color over time because of this degradation.

A CRT used in color image reproduction facilities should be selected to have good registration and minimum color crosstalk. Such CRT's are generally factory calibrated to have a particular color temperature, for example $D_{65}$ (6500° K.), dynamic range (black to white) and grey scale tracking (color constancy from black to white).

During use of an image processing system, including a calibrated monitor, a color image can be digitally stored in many different formats. One storage format is digital log exposure code values, where the log exposure of the image is stored as red, green and blue color values for each pixel in the image. Since these log exposure code values are frequently stored as floating point values, it is necessary to go through a conversion to an integer format, for example, conversion to digital exposure code values for the monitor, which may be used in building/accessing a video shaper. If other formats, such as color difference signals or CIELAB, are used, the conversion to digital exposure code values for the monitor must include transformation of the data back to basic components.

In the color reproduction industry different aim or preferred tone scales are used for different purposes (see Photographic Materials and Processes by Stroebel et al. Focal Press, 1986) and typically a monitor is not adjusted to produce a particular tone scale. As a result, users must estimate how a picture displayed on the monitor will actually be reproduced when made into a hard copy, as well as guess about the changes that have occurred in the monitor over time.

What is needed is an automatic method of calibrating a monitor to a desired tone scale and then controlling the monitor at that same tone scale as the monitor ages, so that the user will see on the CRT display what will actually be produced in the hard copy version.

SUMMARY OF THE INVENTION

It is an object of the present invention to provide for automatic and consistent calibration of a monitor to a desired tone scale.

It is also an object of the present invention to allow automatic control to the same tone scale as used for the original calibration.

It is a further object of the present invention to provide an automatic calibration system that is low in cost by using a single channel light meter.

It is an additional object of the present invention to allow easy creation of video shapers for various tone scales for a CRT monitor, allowing the monitor to change tone scales by simply loading the corresponding video shaper into the frame buffer.

It is a further object of the present invention to provide a monitor in which, as the dynamic range of the monitor changes over time, the monitor, up to a point, will constantly be able to accurately reproduce digital stored images.

It is an object of the present invention to provide a calibration method that takes into account and corrects for all the changes in the light output of the monitor.

It is another object of the present invention to correct for crosstalk between channels.

The above objects can be attained by a system that uses a single channel light meter to measure the red, green and blue light output response curves of a monitor and a computer to project a desired red, green and blue tone scale through the monitor response curve to obtain a crosstalk corrected, look-up table or video shaper that calibrates the monitor to the desired tone scale. The system is then used periodically throughout the life of the monitor to rebuild the video shaper, so that the tone scale reproduction remains constant as the monitor changes.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
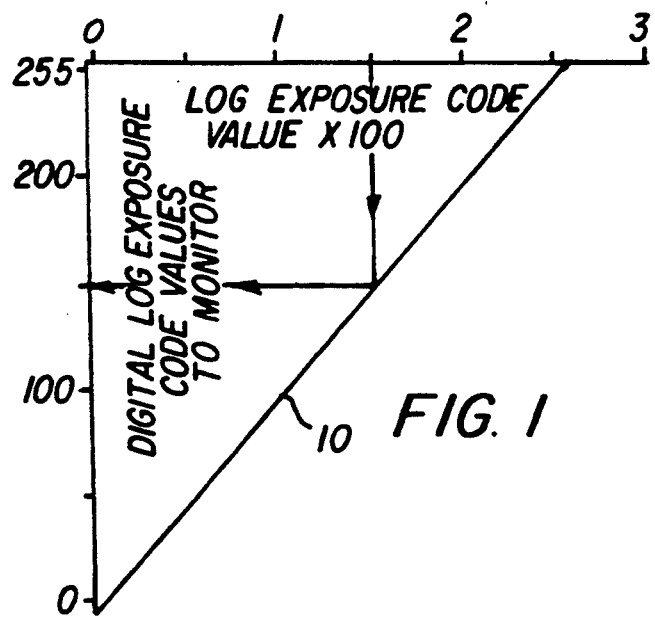
FIG. 1 illustrates conversion of image data of a single color in a log exposure code value format to digital monitor code values that can be used by a digital-to-analog converter to produce a drive signal for an electron beam gun.
Figure 2:
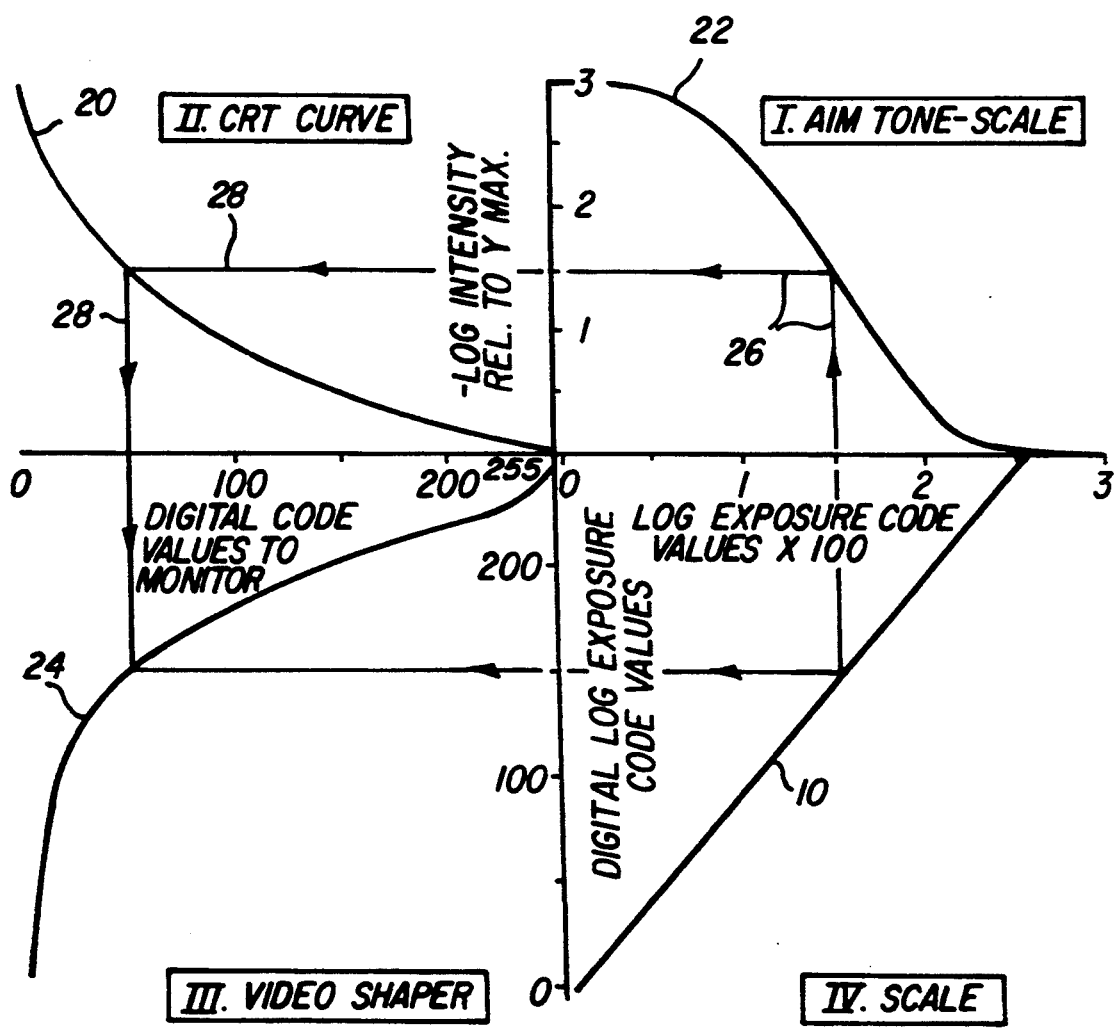
FIG. 2 depicts the principles of building and using a video shaper curve 24 in accordance with the present invention.

The principles of the present invention are illustrated in FIG. 2. A CRT (monitor) characteristic curve for each channel (red, green and blue) of the monitor is measured, however, for convenience only one of the curves will be discussed. This response is measured by sending a sequence of digital code values to the digital to analog converter for the CRT frame buffer and measuring the light output response of the monitor in watts. The characteristic response curve for each channel is then normalized with respect to an initial/desired highlight (white) of the monitor. This normalization ties the measured data to the initial/desired highlight of the monitor and allows the system of the present invention to compensate for changes in CRT light output response. These three normalized characteristic curves are then converted into negative log intensity curves, such as illustrated by curve 20 in FIG. 2. Typically this curve 20 is stored as an array or table with the index being the digital code value applied to the monitor and the entry being the light output intensity measured. A desired or aim tone scale or curve target 22 is chosen, and the tone scale curve 22 and the CRT curve 20 are used to build a video shaper curve 24 for each channel, respectively. Typically, the tone scale curve will be in the form of a table or array in which the index is log exposure code values and the entries are negative log intensity values. When building a video shaper curve a log exposure code value, for example 1.5, is projected or transformed through the aim tone scale curve 22, as illustrated by projection pointers 26, to obtain a negative log intensity value of approximately 1.5. This involves looking in the aim tone scale array at the entry for index 1.5 and obtaining the entry of approximately 1.5. The aim negative log intensity value in this case 1.5, is projected or transformed through the CRT curve 20 to obtain a monitor digital code value of approximately 50 as shown by the projection lines 28. This involves scanning the CRT characteristic curve for a closest match to the aim negative log intensity. The index into the CRT characteristic curve for this closest match is the digital monitor code value necessary to produce this desired negative log intensity when the corresponding log exposure code value exists in the image. The curve 24 preferably is an array or lookup table with either the log exposure code value or the scaled log exposure code value as the index and the corresponding entry being the monitor digital code value of the match. In the particular example discussed above, the index would be either 1.5 or 150 and the entry would be 50. As a result, when a stored image value, of 1.5 (log exposure) or 150 (scaled log exposure) is applied to the array or video shaper (look-up table) an output of 50 would be produced and applied to the corresponding digital-to-analog converter of the frame buffer producing a video signal to the monitor. This process of projecting through the tone scale curve 22 and the CRT curve 28 is performed for each possible log exposure code value, thereby creating curve 24. Curves for all three channels are created and are stored as a video shaper. Such a set of R, G, B video shapers may be loaded in the frame buffer to produce the desired tone scale.

An important prerequisite of the present invention is that the monitor be initially adjusted (set up) to have a dynamic range that is wider than the dynamic ranges of the images to be displayed. Such a setup or adjustment provides unused code values at each end of the monitors dynamic range to thereby allow for the automatic calibration/control adjustments which may be needed over the life of the monitor. For example, for an 8 bit per channel system, a monitor is often set up so that the desired highlight (white) is set at code values somewhat less than 255, typically 245, 245, 245 and the desired lowlight (black) is set at code values greater than zero, typically 10, 10, 10. The extra code values allow the video shaper curve 24 to be adjusted to maintain a desired highlight, lowlight and dynamic range as the monitor output varies. If, as the monitor ages, the dynamic range of one channel decreases while the other two channels remain unchanged, it is necessary to calculate a new video shaper for that channel. This new video shaper will use the extra control code values on the upper and lower end of the range to maintain the initial highlight and lowlight by displaying the highlight with a different code value combination from that of the previous video shaper curve.

Figure 3:
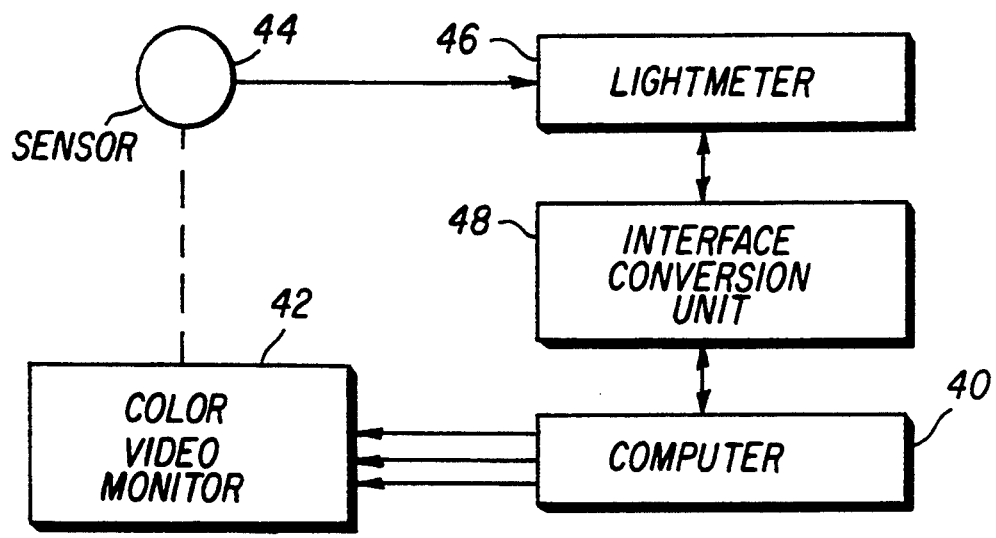
FIG. 3 illustrates an image processing system and the monitor calibration/control hardware according to the present invention.

The typical color imaging system including the hardware necessary to calibrate the monitor, as illustrated in FIG. 3, includes a computer 40 such as a Sun Microsystem computer available from Sun Microsystems, Inc. of Mountain View, Calif. The computer 40 is connected to a color video monitor 42 such as Sony model 1950 color video monitor available from Sony of Japan. The display produced by the color monitor 42 is monitored by a sensor such as the UDT S-370 manufactured by United Detectors Technology, Inc. of Florida, which includes a one centimeter square silicon photodiode. The photodiode is covered by a radiometric filter (not shown) such as the United Detectors Technology filter model 247. The sensor 44 is connected by a conventional shielded coaxial cable to a light meter 46, such as a UDT 370 single channel light meter also available from United Detectors Technology, Inc. An interface conversion unit 48 is used to convert the IEEE - 488 standard for computer interfaces used by the UDT S-370 to the RS-232 standard for interfaces used by the Sun Microsystems computer. This allows the light intensity measured by the sensor 44 to be provided directly to a conventional interface of the computer 40. It is important, if a light meter and sensor other than the ones indicated above are chosen, that the sensor of the meter be responsive to the portions of the spectrum where the CRT phosphors emit light, that is the meter must be able to sense a light difference between a 0,0,0 monitor code and a 0,0,1 monitor codes. As a consequence, it is also necessary that the meter have a higher resolution than the monitor being measured. If the monitor code values are 8 bit codes it is recommended that the resolution of the meter be no less than 12 bits and preferably 16. The sensor must also have adequate sensitivity to accurately characterize the CRT lowlights. The light meter 46 must also have an integration time sufficient to obtain a low noise CRT light output intensity reading. This reading time should encompass several CRT scan fields resulting in a multifield average. The light meter 46 should also periodically be calibrated to a known light source of an appropriate calibration laboratory. The filter (not shown) is designed to flatten out the response curve of the sensor 44. If the monitor is subject to flare or exhibits misregistration or other forms of crosstalk it may also be necessary to use a broad band color filter of the corresponding color during each response measurement or otherwise address such concerns.

Figure 4:
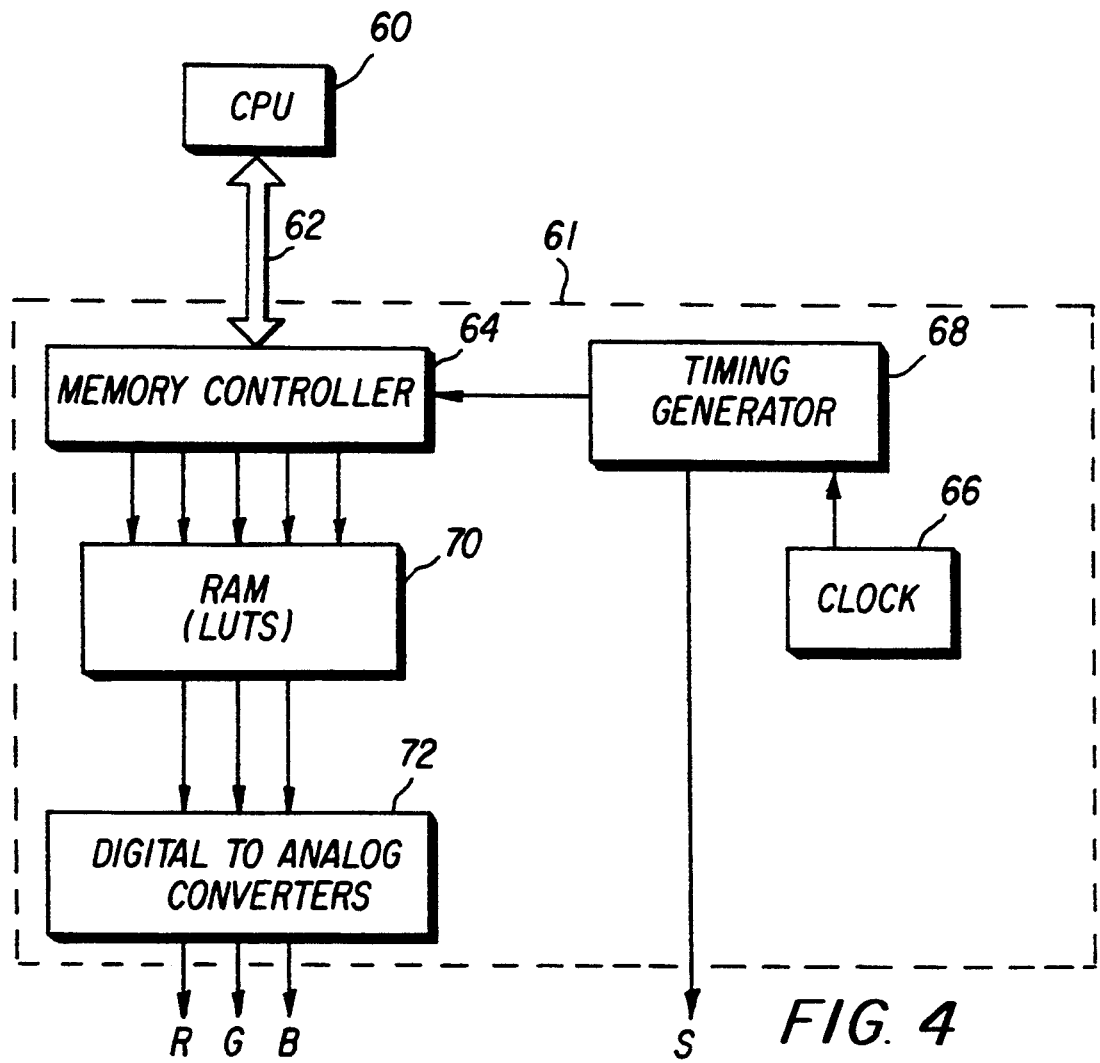
FIG. 4 illustrates details of a frame buffer in the computer 40 of FIG. 8.

The computer 40, as illustrated in FIG. 4, includes a conventional central processor unit 60 connected to a conventional video frame buffer 61 by a bus 62. The frame buffer 61 includes a conventional memory controller 64, a clock 66, and a timing generator 68 which produces a sync signal supplied to the monitor and the memory controller. The memory controller 64 is connected to a random access memory 70 in which the shaper curve look-up tables (LUTs) are typically stored. The output of the memory 70 is supplied to conventional video digital-to-analog converters 72 which provide the red, green and blue analog drive signals to the monitor.

Figure 5:
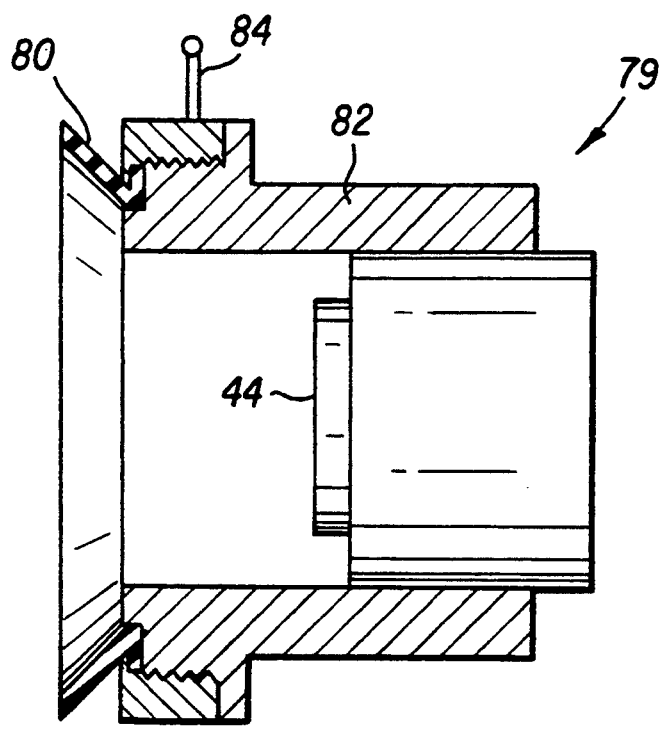
FIG. 5 depicts a suction cup sensor mounting assembly 79.

The silicon photodiode light sensor 44 and radiometric filter (not shown) are preferably recessed in a suction cup assembly 79 as illustrated in FIG. 5. In this assembly 79, the rubber portion 80 of the assembly 79 is mounted on the end of a barrel 82 in which the sensor 44 and filter are mounted. The interior of the barrel 82 and the rubber portion 80 of the suction cup assembly 79 are preferably a color, such as black, which will reduce light reflections. The barrel 82 and rubber portion 80 can be created as a multiple part assembly with O rings creating a vacuum fit around the sensor 44 or the barrel 82 rubber and portion 80 can be manufactured as a single injection molded unit. The suction cup assembly preferably includes an alignment sight or tab 84 which extends from the rubber portion in a single direction. The alignment sight can also act as a vacuum release valve.

Figure 6:
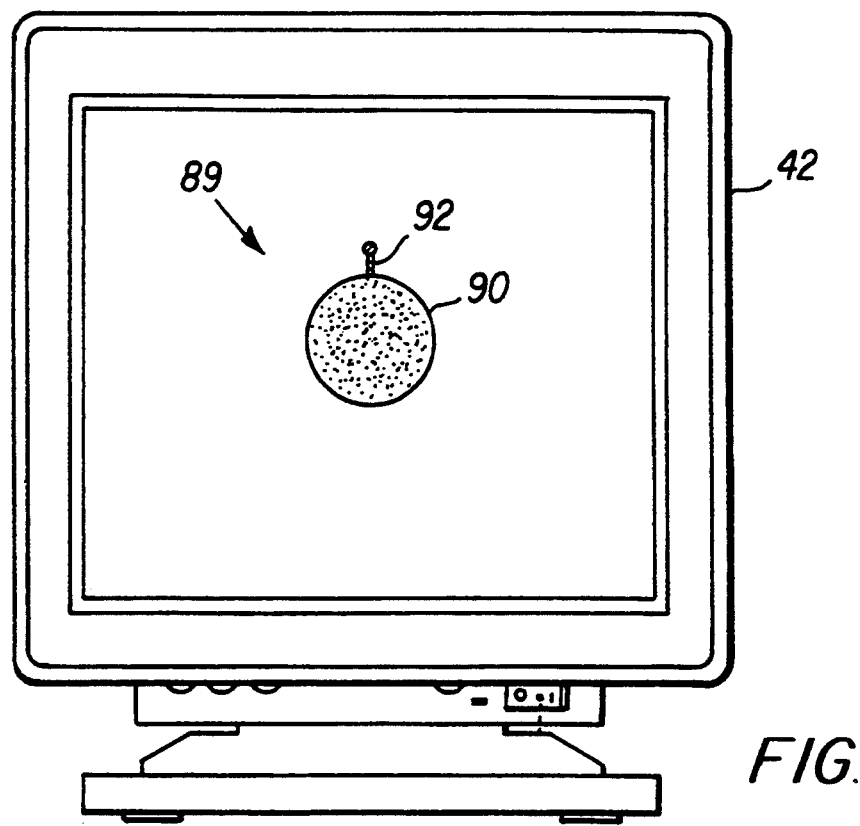
FIG. 6 shows an alignment target display 89.

It is important that the sensor 44 be correctly and repeatably aligned in the center of the screen of the monitor 42, so that the sensor reads the same from monitor to monitor to prevent any nonsymmetries of the sensor field of view from causing errors. As a result, it is preferable that a suction cup target 89, as illustrated in FIG. 6, be displayed on the monitor 42 at the time the suction cup assembly 79 is attached to the faceplate of the monitor 42. This target 89 is produced as a monitor display by the computer 40 and includes a suction cup portion 90 and an alignment sight 92 corresponding to the alignment sight 84 on the suction cup assembly 79 illustrated in FIG. 5. It is assumed that the monitor, before the present invention is applied thereto, has been adjusted as to convergence, purity, geometry and other standard alignment tests and the monitor has been found to be satisfactory. Before any measurements are taken, the monitor should be allowed sufficient time to warm up and should be degaussed. The various controls for brightness, contrast, etc., should also be set to the (detent) of their range. The monitor must also be positioned such that there is no direct light on the faceplate, so that light reflected back onto the sensor 44 is inhibited. It is also preferable that a black cloth be draped over the faceplate of the monitor 42 and the attached assembly 79.

Figure 7:
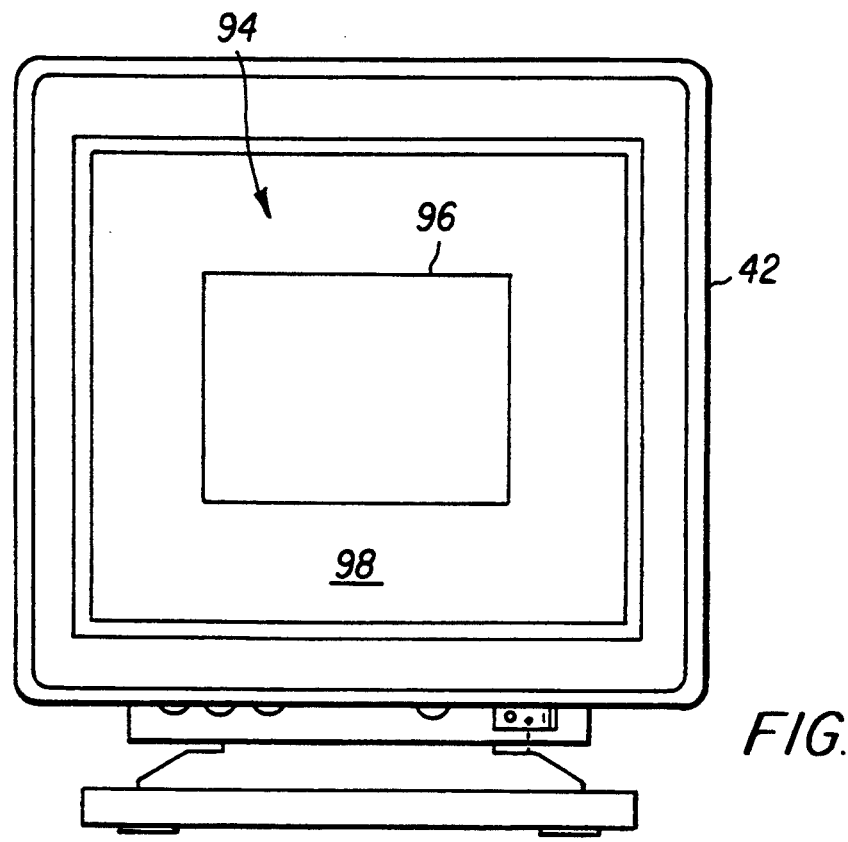
FIG. 7 shows a color test target display 94.

During the calibration operation a calibration display 94, as illustrated in FIG. 7, should be displayed on the monitor 42. The calibration display 94 includes a color center patch 96 which, during the calibration operation, is varied from the lowest light level to the highest light level of the range of the digital code values of the system for each color. For an 8 bit system this would involve varying the code values and, as a result, the intensity of the center patch from zero to 255 for each channel while the other two channels are held constant with code values of zero. The center patch 96 could be the entire screen and it is preferable that the patch be much bigger than the field of view of the sensor 44 to overfill the sensor 44. During the test each change in the code value results in a change in the actual response of the monitor 42 which is measured with the meter 46. It is preferable that the code values, during the actual response measurement of each channel, start with zero and increment upward, because of the typical decay characteristics of phosphors. The test target 94 also includes a surround 98 for the color patch 96 and the surround 98 must be a lowlight (black) having code values of 0, 0, 0. The surround 98 must be dark to prevent light from the background reflecting into the sensor 44 and being measured as part of the signal produced by the current code value combination. A non-black background may cause a flare light effect causing the meter 46 to indicate higher lowlights than actually displayed.

Figure 8:
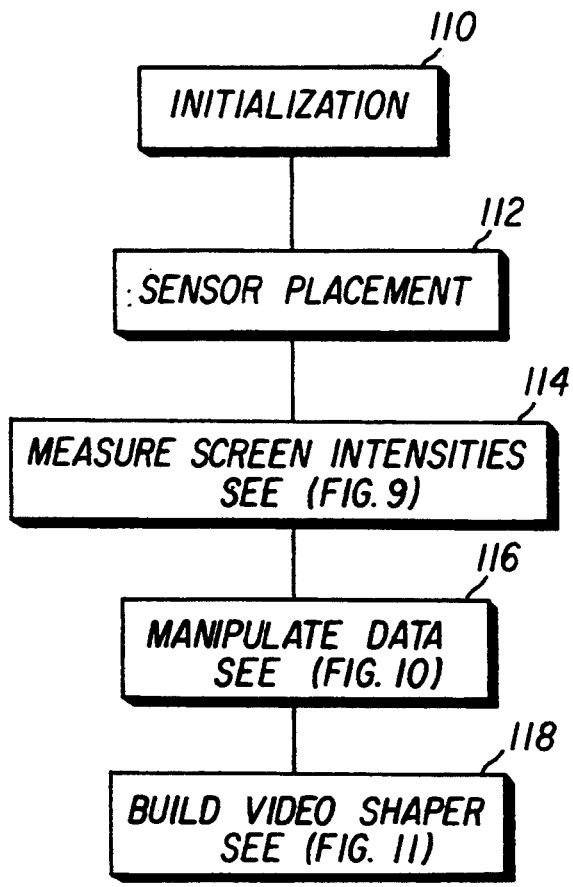
FIG. 8 depicts the steps in building a video shaper 24 in accordance with the present invention.

Once the monitor has been warmed up and degaussed, the procedure illustrated in FIG. 8 is performed. The initialization step 110 involves capping the assembly 79, so that no light reaches the sensor 44, and zeroing the meter 44 to remove possible changes in meter gain offset caused by ambient temperature variations. Next, the sensor is properly placed 112 by first displaying the alignment target 89 and attaching the suction cup assembly 79 to the screen properly positioned on the alignment target 89. Once the sensor 44 is mounted, the system measures 114 the CRT screen intensities for each of the color channels of the system. This will be discussed in more detail with respect to FIG. 9, but essentially involves incrementing the color code values one at a time through their dynamic range while storing the actual responses in an array. Next, the actual response data produced for each channel is manipulated 116 which essentially involves normalizing and smoothing the data, and converting the data to negative log intensity data. Step 116 will be discussed in more detail with respect to FIG. 10. The final step is to build 118 the video shaper (look-up table) corresponding to the shaper curve 24 illustrated in FIG. 2. This step 118 will be discussed in more detail with respect to FIG. 11.

Figure 9:
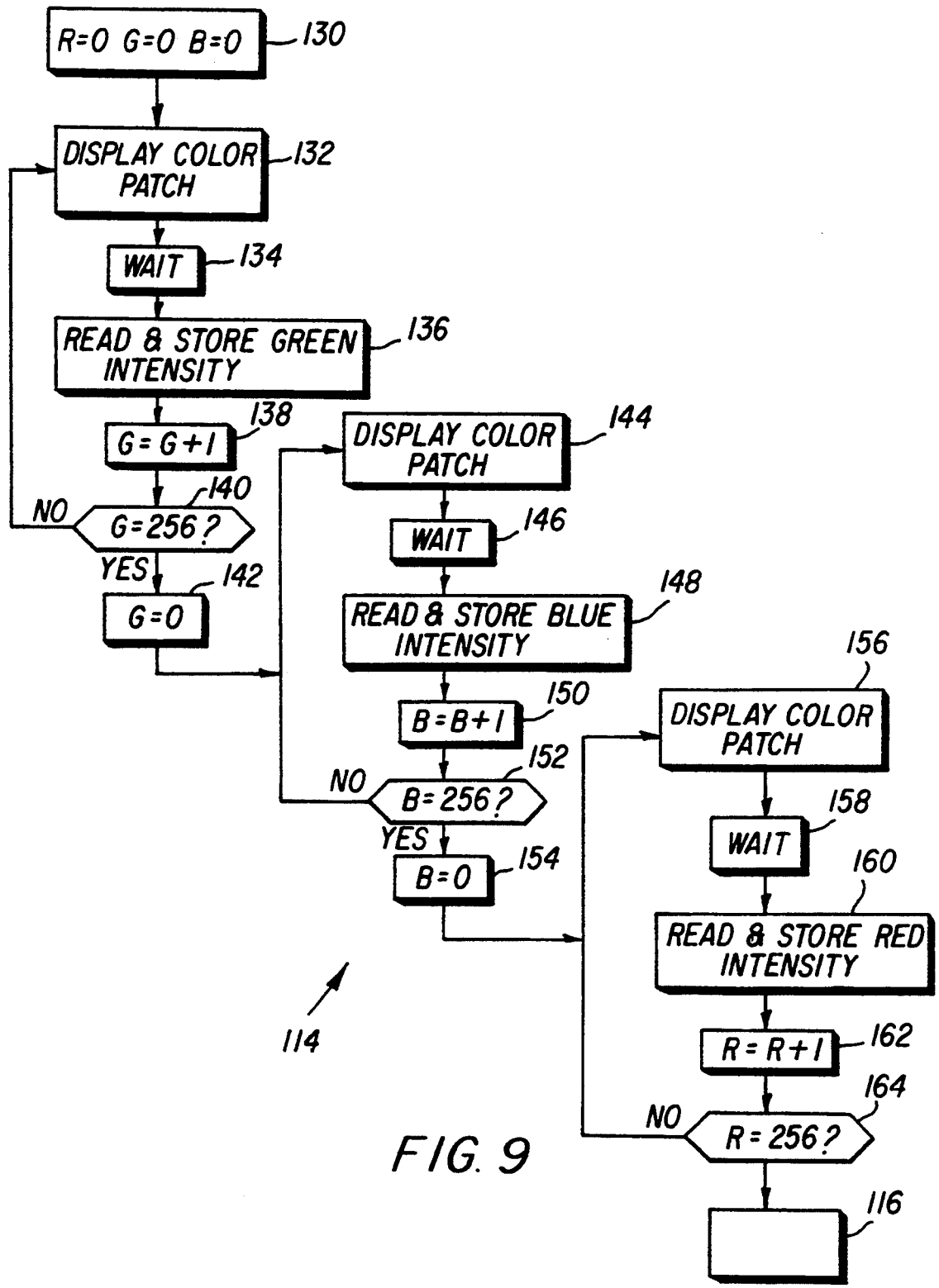
FIG. 9 is a flowchart of the CRT light output measurement operation 114 of FIG. 3.

During the actual measurement of the CRT light output, the color of the center patch 96 is varied by ramping through the possible code values for a color channel while keeping the other two channels constant with code values of zero. There are many different ways in which this ramping process can be performed and FIG. 9 illustrates a preferred one of the possible methods. In the first step of the method illustrated in FIG. 9, all color code values are set 130 to zero. The system then enters a green color ramping loop where the color, specified by the current code values of the red, green and blue color codes, is displayed 132 preceded by blanking of the screen for the persistence time of the particular phosphor being driven. The system must then wait 134 a delay time before the light meter 46 is actuated and read 136. This delay time includes the rise time of the particular phosphor being stimulated, the sensor 44 rise time and an integration time required for the sensor 44 to read the lowest light level but must be long enough to accurately read the light level at the lowlight values. The intensity value is preferably stored in an array with an index corresponding to the green monitor code value input to produce that intensity. The system then increments 138 the green code value and tests 140 to determine whether the end of the cycle has been reached. If not, the system returns to display 130 to another intensity of the color patch 96 which, as previously mentioned, includes blanking the screen before sending the new code values to the monitor. If the end of the green cycle has been reached, the green code value is reset 142 to zero and the system enters the blue color loop. In this loop, the 144–154 are the same as steps 132–142 except that the blue intensity is varied while red and green code values are held at zero. Once the blue loop is finished, the red loop is entered which includes steps 156–164 which correspond to the steps of the previous two color loops.

When the intensity of the light is read in steps 136, 148 or 160, the meter 46 also produces a success/failure code with the measured data which can be utilized for error checking. It is also appropriate to verify that the data being received resembles the expected characteristic curve. For example, as the code values sent to the monitor increase, there should be an increase in the measured light intensity. As a result, a plot of the raw CRT light output meter readings for each channel can be used to check and verify that the sensor 44 is operating properly, that is, is pointing at the monitor 42, the monitor 42 is on and the monitor 42 is displaying the appropriate signal.

Figure 10:
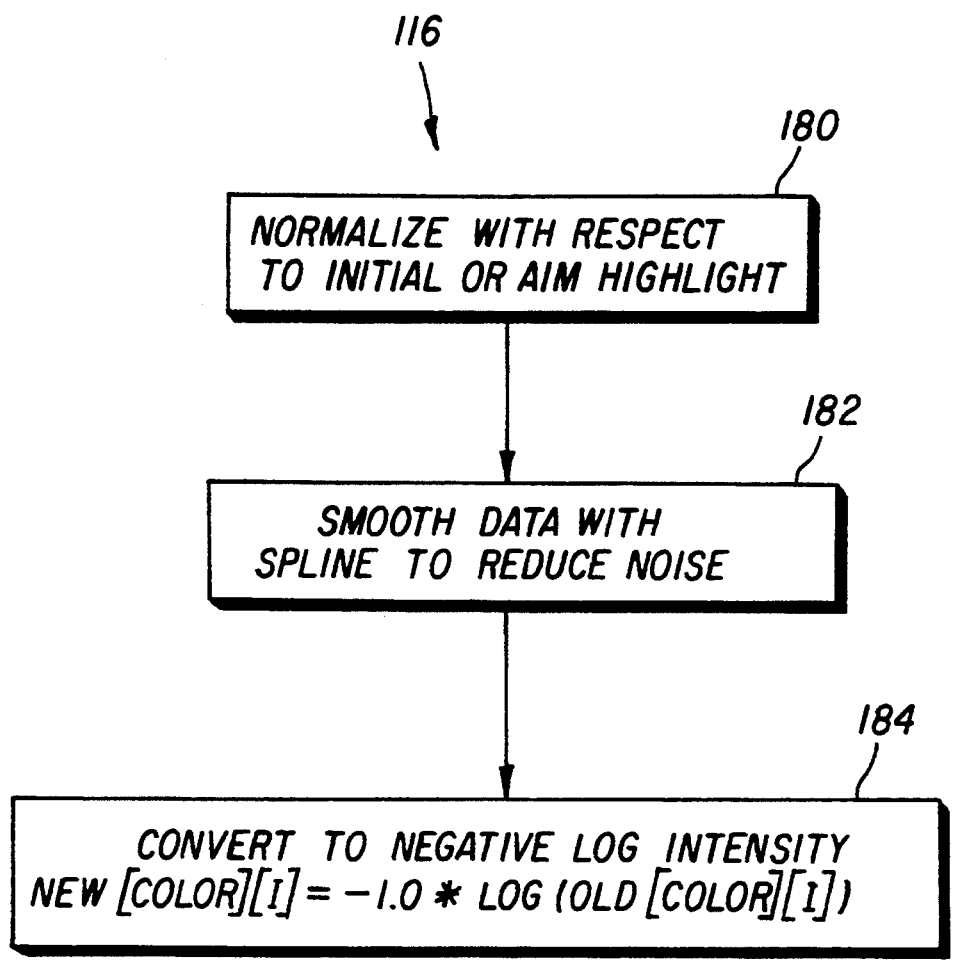
FIG. 10 illustrates the data manipulation operation 116 of FIG. 8.

Once the data for each channel has been stored in corresponding CRT light output data arrays, the channel data, as illustrated in FIG. 10, is conventionally normalized 180 relative to a reading of an initial or aim highlight. This highlight is typically established when the monitor is factory calibrated. The data is then smoothed 182 using a conventional spline routine, such as a least squares fit, to reduce noise. The smoothed data is then converted 184 to negative log intensity data as illustrated in step 184 where "color" is the variable selecting the channel and i is the index to the stored intensity value. Since a log of 0 is an impermissible mathematical operation, it is necessary to check all data values to ensure no data value is zero. The result of step 184 is three arrays with the index into each array being a monitor code value and the contents of each element or entry in the array being a negative log intensity.

Figure 11:
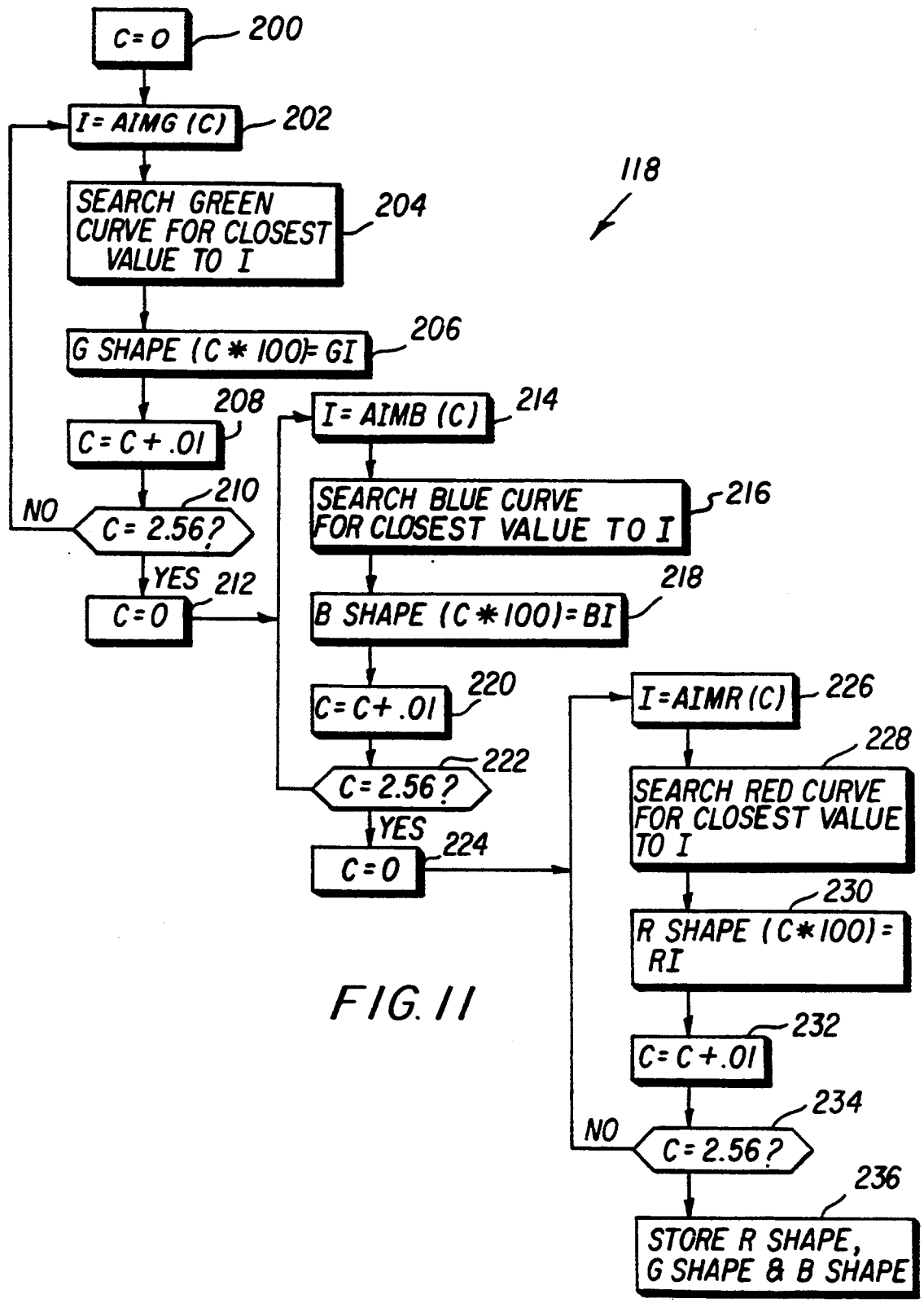
FIG. 11 is a flowchart illustrating how a three color video shaper is built.

As previously discussed, building a video shaper curve 24 for each channel of the monitor involves projecting or mapping the possible input values through the desired tone scale curve 22 and the actual response curve 24 to obtain calibrated monitor code values for all the possible input values. The method discussed below with respect to FIG. 11 assumes that a desired or aim tone scale curve or array is available that stores the negative log intensity values for the range of log exposure code values that can be found in an image and that a log exposure code value is an index to the entry of the table containing the corresponding negative log intensity (tone scale intensity) for the desired aim tone scale. Other methods of providing a tone scale curve are possible, for example, a formula could be provided that will produce a tone scale intensity for each log exposure code value. The operation 118 of building a video shaper curve 24, as illustrated in FIG. 11, begins by setting 200 a log exposure code value index (C) to zero. The system then enters one of three loops in which the video shaper tables are built. The first loop is for the green shaper curve or table. The first step 202 in the loop is to access a green AIM tone scale table using the log exposure code value index and read out a negative log intensity value or a tone scale intensity corresponding thereto. This intensity value is then used to search 204 the green CRT characteristic curve array of negative log intensity values for the closest match to the aim negative log intensity. When this closest match is found the index GI for the matching value in the green CRT array is stored 206 in a green video shaper table or green look-up table using a scaled log exposure code value as the index into the green video shaper. The log exposure code value is incremented 208 and tested 210 to determine whether the end of the loop has been reached. If not, the system returns for another cycle. If the green video shaper or curve has been completely created the index is set back to zero and the blue color loop is entered. This loop includes steps 214–224 which are the same as in the green loop except the blue tone scale table is accessed, the blue CRT curve is searched and the blue video shaper array or look-up table is created. When the blue loop is finished, the system moves to the red loop where steps 226–234 are performed to build the red shaper array. Steps 222–234 are the same as in the green and blue loops except the red aim tone scale table is accessed, the red CRT curve is searched and the red video shaper is created. Once the red, green and blue shaper arrays have been created, the video shapers are stored 236. A specific set of these video shapers may be loaded into RAM 70 as the R, G, B video shaper look-up tables.

During an actual image processing operation any image processing operation, such as filtering, edge enhancement, etc., can be performed on the digital image stored in the computer 40. Once the final image processing is completed, all the pixels in the image are converted to output monitor code values using the red, green and blue look-up tables created as illustrated in FIG. 11. This involves using the final processed image pixel (monitor code) values as indices onto the tables to obtain the calibrated image output (monitor code) values. The calibrated image can then be stored for later display or sent to the monitor through the digital-to-analog converters 72 to thereby display the calibrated and converted image.

This invention can be used at the factory to create the initial look-up tables that calibrate the monitor to the desired AIM tone scale. Later in the field the hardware including the sensor 44, light meter 46 and interface conversion unit 48 can be again connected to the computer 40 and monitor 42 and the monitor 42 can easily be recalibrated. The same procedure is used to recalibrate the monitor 42 as was used to initially calibrate the monitor 42. It is preferred that the software that performs the operations of steps 114, 116 and 118 be stored, so that it may be transported with the necessary calibration hardware. However, the software could be stored as a calibration utility in the computer 40. It is preferred that this recalibration operation be performed as required, thereby maintaining a high quality, accurate display calibrated to the desired tone scale.

A calibration look-up table can be created and stored in a nonvolatile memory of the computer such as a disk, for each of the tone scales with which the monitor will be used. These appropriate tone scales then can be loaded into the frame buffer memory 70 whenever that tone scale is to be used for image display, thereby allowing the image processing system to change between tone scales very quickly as needed. Such a system will allow a user to accurately display pictorial images reproduced on different types of media simply by loading the appropriate tone scale.

Because the present invention calibrates using actual monitor response values, the calibration compensates not only for changes such as aging of the monitor itself but also for variability of other analog components such as the digital-to-analog converters in the frame buffer. The calibration can be further enhanced by correction for the color crosstalk that can occur between channels. This crosstalk correction corrects for the error introduced into the measured light output of one color by the unintentional contributions of the other colors. A crosstalk correction value is created by multiplying the light output for a monitor code input of 0,0,0 by a crosstalk ratio. The crosstalk ratio for a color is a sum of the high light output values for all three colors divided into a sum of the high light values for the other two colors. For example, a red crosstalk correction value RC is produced in accordance with:

$$RC = ((G(255) + B(255))/(R(255) + G(255) + B(255)))* RGB(0,0,0)$$

The correction value is subtracted from each of the actual monitor output values in the corresponding actual response curve. In the above example RC is subtracted from each of the red intensity values read and stored in FIG. 9.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, the present invention has been described with respect to calibrating a color CRT, however, it can be also used to calibrate black and white CRTs used to display digital X-ray images. Backlit liquid crystal displays can also be calibrated. It is also possible to conduct a faster calibration if less than all the CRT light intensity codes are used to produce the response curves and the missing light output values of the curve are obtained by spline integration between the measured points. If such is performed more actual response measurements need to be made in the rapidly changing portions of the curves than in the more slowly changing portions. The red, green and blue look-up tables have been discussed as preferably being loaded into the frame buffer. These tables could also be part of a portion that converts the image to a scaled image. Other devices for measuring the light intensity, such as a spectral radiometer could be used resulting in a higher cost and slower system.

What is claimed is:

1. A calibration apparatus for calibrating a multi-color CRT monitor driven by image input values, using a predetermined tone scale curve comprising:
    a single channel light meter; and
    calibration means for measuring an actual characteristic response of the light source to the input value with said light meter and creating a conversion table used to convert the input value to a calibrated input value, where the conversion table is created by transforming the input value into the calibrated input value using the actual response normalized to a light source relative aim highlight and the target causing the light source to create light of a different source light level.

2. A calibration apparatus for calibrating a light source driven by an input value using a predetermined target scale curve, said light source comprising a CRT monitor, and said input value comprising image input values and said target scale curve comprising a tone scale curve, comprising:
    a light meter; and
    calibration means for measuring an actual characteristic response of the light source to the input value with said light meter and creating a conversion table used to convert the input value to a calibrated input value, where the conversion table is created by transforming the input value into the calibrated input value using the actual response and the target scale curve, said calibration means comprising means for correcting crosstalk between color channels.

3. A calibration apparatus for calibrating a CRT monitor light source driven by image input values and using a predetermined tone scale curve, comprising:
    a light meter including a suction cup assembly with a photosensor said photosensor having a field of view; and
    calibration means for measuring actual responses of the light source to the input values with said light meter and creating a conversion table used to convert the input values to calibrated input values, where the conversion table is created by transforming the input values into the calibrated input values using the actual responses and the target tone scale curve, and including color patch display means for producing a color patch on the monitor substantially larger than said field of view of said photosensor.

4. A calibration apparatus for calibrating a display driven CRT monitor, comprising:
    a single light sensor attached to a faceplate of the monitor;
    a single channel light meter connected to said sensor; and
    a computer connected to the monitor and said meter, said computer comprising:
    means for varying actual input codes provided to the monitor for each channel of the monitor and measuring actual responses of the monitor to the varying input codes;
    means for normalizing the actual responses to an aim highlight;
    means for smoothing the normalized responses and converting the smoothed normalized responses to negative log intensity values;
    means for producing aim tone scale intensities for possible image code values;
    means for searching the negative log intensity values for closest matches to the tone scale intensities; and
    means for creating a table of actual input code values for each possible image code value where closest matches between the negative log intensity values and aim tone scale intensities exist.

5. A method of calibrating a CRT monitor light source using a predetermined target scale curve, comprising the steps of:
(a) measuring actual responses of the light source to image input values including normalizing the actual responses with respect to a monitor aim highlight said monitor having a wider dynamic range than said input image values and said normalizing step normalizes the highlight at less than a maximum output of the monitor;
(b) mapping the image input values through the target tone scale curve into desired response values;
(c) mapping the desired response values through the actual responses into calibrated input values; and
(d) storing the calibrated input values in a look-up table having the image input values as indices into the look-up table.

6. A method of calibrating a CRT monitor light source, comprising the steps of:
(a) measuring actual responses of the light source to image input values including measuring actual intensity responses to corresponding actual input values applied to the monitor and subtracting a cross talk correction value from the actual response;
(b) mapping the image input values through a target tone scale curve into desired response values including obtaining a scale intensity from a tone scale table for an index input value;
(c) mapping the desired response values through the actual responses into calibrated input values, including:
  (i) searching the actual intensity responses for a closest match between the scale intensity and the actual intensity response, and
  (ii) designating the corresponding actual input value of the closest match as the calibrated input value having the index input value, so that when an image is to be reproduced on the monitor image index input values of the image are converted into calibrated input values supplied to the monitor
(d) storing the calibrated input values in a look-up table having the image input values as indices into the look-up table.

* * * * *